United States Patent [19]

Sasaki

[11] Patent Number: 4,679,565
[45] Date of Patent: Jul. 14, 1987

[54] ULTRASONIC DIAGNOSTIC APPARATUS USING NON-LINEAR PARAMETERS OF AN ORGAN

[75] Inventor: Hiroshi Sasaki, Ootawara, Japan

[73] Assignee: Kabushiki Kaisha Toshiba, Kawasaki, Japan

[21] Appl. No.: 790,471

[22] Filed: Oct. 23, 1985

[30] Foreign Application Priority Data

Oct. 23, 1984 [JP] Japan ................................. 59-222715

[51] Int. Cl.⁴ .............................................. A61B 10/00
[52] U.S. Cl. ...................................... 128/660; 73/602
[58] Field of Search .................. 128/660; 73/597, 599, 73/602

[56] References Cited

U.S. PATENT DOCUMENTS

4,566,460  1/1986  Sato et al. ............................ 128/660

Primary Examiner—Kyle L. Howell
Assistant Examiner—Francis J. Jaworski
Attorney, Agent, or Firm—Finnegan, Henderson, Farabow, Garrett & Dunner

[57] ABSTRACT

Disclosed are a method and apparatus for displaying a tomographic image based upon a non-linear parameter-inside an organ. An ultrasonic transducer radiates to the organ ultrasonic burst waves of two different frequencies $\omega 1$ and $\omega 2$ at a predetermined time interval, and receives the reflected waves thereof. The reflected waves of $\omega 1$ and $\omega 2$ are mixed with each other due to a non-linear effect inside the organ, thereby generating a differential reflected wave of $(\omega 1 - \omega 2)$ which is received by the transducer. The intensities of the reflected wave of $\omega 1$ and the differential reflected wave are stored in a frame memory as a function of time. An operational unit calculates the intensity of the forward wave of $\omega 2$ at a position of mixing by exponential gain compensation, and then calculates a non-linear parameter from the intensities of the reflected wave of $\omega 1$, the differential reflected wave and the forward wave of $\omega 2$ when the mixing occurs. A tomographic image based on the non-linear parameter is displayed by a display unit.

10 Claims, 15 Drawing Figures

B MODE IMAGE     NONLINEAR PARAMETER IMAGE

ULTRASONIC DIAGNOSTIC APPARATUS USING NON-LINEAR PARAMETERS OF AN ORGAN

BACKGROUND OF THE INVENTION

The present invention relates to a method for imaging non-linear parameters of tissues of an organ and an ultrasonic diagnostic apparatus using the method.

In a prior art ultrasonic diagnostic apparatus, an ultrasonic wave having a given frequency is transmitted into an organ, and a reflected wave from the inside the organ is detected, so that the distribution of the intensity of the reflected wave is imaged as an ultrasonic tomographic image (B-mode image) used for diagnosis. Since the diagnosing apparatus derives an image from a linear parameter, i.e., the intensity of the reflected wave (reflection coefficient), the obtained tomographic image does not directly represent structural characteristics of the tissues of organs, in other words, the acoustic characteristics of the tissues of organs.

Recently, there are extensive requirements for detecting the structural characteristics of the tissues of organs using ultrasonic waves for the purpose of diagnosis. The structural characteristics of organs include attenuation of the ultrasonic wave, speed of propagation thereof, diffusion, and non-linear parameters (coefficients). From among them, according to the non-linear parameter indications, characteristics of the tissues of organs can be easily detected.

An attempt to image non-linear parameters of an organ is disclosed in "Real-Time Non-linear Parameter Tomography" by Nobuyuki Ichida et al, Review of the 43-rd meeting of the Japan Society of Ultrasonics in Medicine, p. 519, Dec., 1973. From these attempts, to image non-linear parameters, a low frequency pumping wave is generated in a direction perpendicular to a signal ultrasonic wave or in a direction opposite thereto, so that a change in the phase of the signal ultrasonic wave is detected.

With this method for imaging the non-linear parameters of organ in accordance with a change in the phase of the signal ultrasonic wave, since the signal ultrasonic wave and the pumping wave are radiated in orthogonal directions or in opposite directions, it is very inconvenient for diagnosing human bodies. In addition, it is difficult to detect a change in the phase of the signal ultrasonic wave indicating a non-linear effect of the organ.

SUMMARY OF THE INVENTION

It is an object of the present invention to provide an improved ultrasonic diagnostic method which permits easy detection and imaging of non-linear parameters of an organ.

It is another object of the present invention to provide an ultrasonic diagnostic apparatus which can easily detect non-linear parameters of an organ.

It is still another object of the present invention to provide an ultrasonic diagnostic apparatus which images non-linear parameters of an organ, and which allows easy diagnosis.

According to a method of the present invention, ultrasonic burst waves of frequencies $\omega 1$ and $\omega 2$ are successively radiated toward a living organ at an interval of a predetermined time period by a ultrasonic transducer. At a position of the organ having a non-linear effect, a reflected wave of $\omega 1$ reflected from a position deeper than the position and the forward wave of $\omega 2$ are mixed with each other, and as a result, an ultrasonic signal having a differential frequency of $(\omega 1 - \omega)$ is generated. The differential ultrasonic signal propagates toward the surface of the organ, and is detected as a differential-frequency reflected wave by the ultrasonic transducer. The intensity of the differential wave depends upon a non-linear parameter, the intensities of the $\omega 1$ reflected wave and the $\omega 2$ forward wave at the position at which the mixing occurs. The intensity of the $\omega 1$ reflected wave at the position of mixing can be determined by detecting in advance the intensity of the $\omega 1$ reflected wave detected by the ultrasonic transducer as a function of time from an instant of generation thereof. The intensity of the differential reflected wave at the position of mixing can be determined by detecting the intensity of the differential reflected wave as a function of time. The intensity of the $\omega 2$ forward wave at the position of mixing can be obtained as a relative value by an exponential function gain compensation calculation on an initial value (may be an arbitrary value) of the $\omega 2$ ultrasonic burst wave at an instant of generation thereof. By a predetermined calculation on these values, the relative non-linear parameters of the organ can be obtained.

DETAILED DESCRIPTION OF THE PREFERRED EMBODIMENT

Figure 1A:
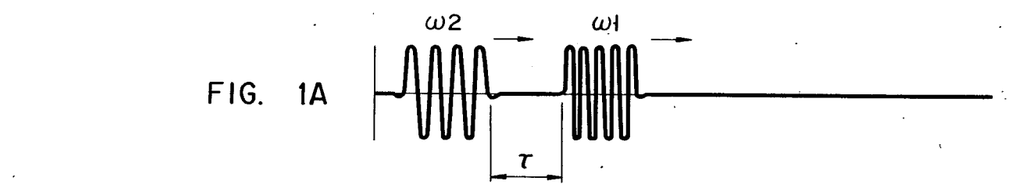
FIGS. 1A, 1B, 1C, and 1D are waveform diagrams for explaining a principle for detecting non-linear parameters of an organ according to the present invention.
Figure 1B:
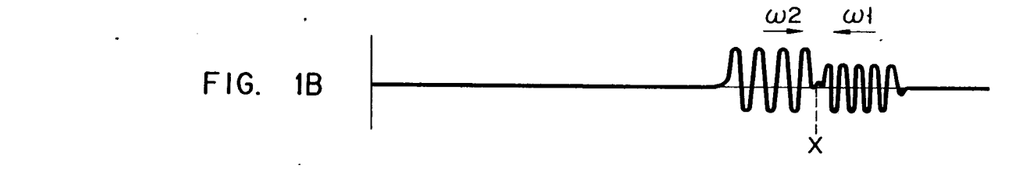
Figure 1C:
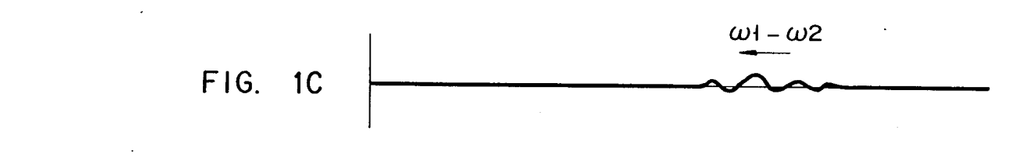
Figure 1D:
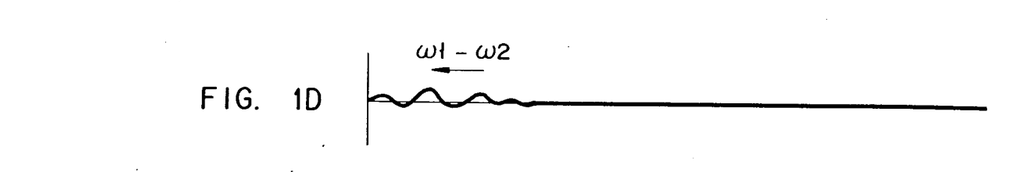

A principle of an ultrasonic diagnostic method according to the present invention will be described with reference to FIG. 1. As shown in FIG. 1(A), two ultrasonic burst waves of frequencies $\omega 1$ and $\omega 2$ are radiated by an ultrasonic transducer array into an organ at a time interval of $\tau$ (about 10 $\mu$sec.). Since the organ has internal acoustic characteristics, the two ultrasonic burst waves are reflected from the inside of the organ. The reflected wave of the first generated ultrasonic burst wave and the second generated ultrasonic burst wave (forward wave) overlap each other at a point x inside the organ. The reflected wave and the forward wave are mixed at the point x due to the non-linear effect of the organ, thereby generating an ultrasonic signal of a differential frequency of $(\omega 1 - \omega 2)$, as shown in FIG. 1(C). The ultrasonic signal propagates as a differential frequency reflected wave toward and reaches the surface of the organ, as shown in FIG. 1(D), to be detected by the ultrasonic transducer. In practice, the $\omega 1$ reflected wave is produced at various points inside the organ, and hence the mixing of the reflected wave and the forward wave takes place at various points. In this case, the origin of a certain differential reflected wave is uniquely determined by the generation timing of the ultrasonic burst waves (forward waves) of the frequencies ω1 and ω2 from the ultrasonic transducer and by the detection timing of the differential reflected wave of (ω1−ω2) by the ultrasonic transducer. In addition, the ultrasonic waves are exponentially attenuated inside the organ, and the intensity of the reflected wave varies in accordance with a reflected point inside the organ.

Therefore, the intensity M(x) of the differential reflected wave at the point x inside the organ is expressed as follows:

$$M(x) = \alpha(x) \cdot r1(x+v\tau) \cdot A1(x+v\tau) \cdot A2(x) \qquad (1)$$

where α(x) is the non-linear parameter (coefficient) at the point x; r1(x) is the reflection coefficient at the point x; A1(x) and A(2) are amplitudes of the ultrasonic burst waves of the frequencies ω1 and ω2 at the point x, respectively; and v is the speed of the ultrasonic wave inside the organ. The amplitude of the ultrasonic burst wave at the point x is determined by an attenuation up to the point x.

In this case, r1(x) A1(x) can be known in advance by detecting the reflected wave of ω1 as a function of time. By calibrating M(x) with these known values, the intensity M'(x) of the differential reflected wave can be given by $$M'(x) = \alpha(x) \cdot A2(x) \qquad (2)$$

A2(x) indicating the amplitude of the ultrasonic burst wave (forward wave) of ω2 is obtained by an exponential function gain compensation ($A2(x) = A0 e^{-\beta x}$) for an initial value A0 since an ultrasonic wave is exponentially attenuated inside the organ. Thus, a tomographic image representing the non-linear parameters α(x) can be obtained.

This corresponds to the fact that the prior art diagnostic apparatus acquires a tomographic image in accordance with reflection coefficients r(x) by detecting a reflected signal $R(x) = r(x)A(x)$ and by calculating the amplitude A(x) on the basis of the exponential gain compensation.

Figure 2:
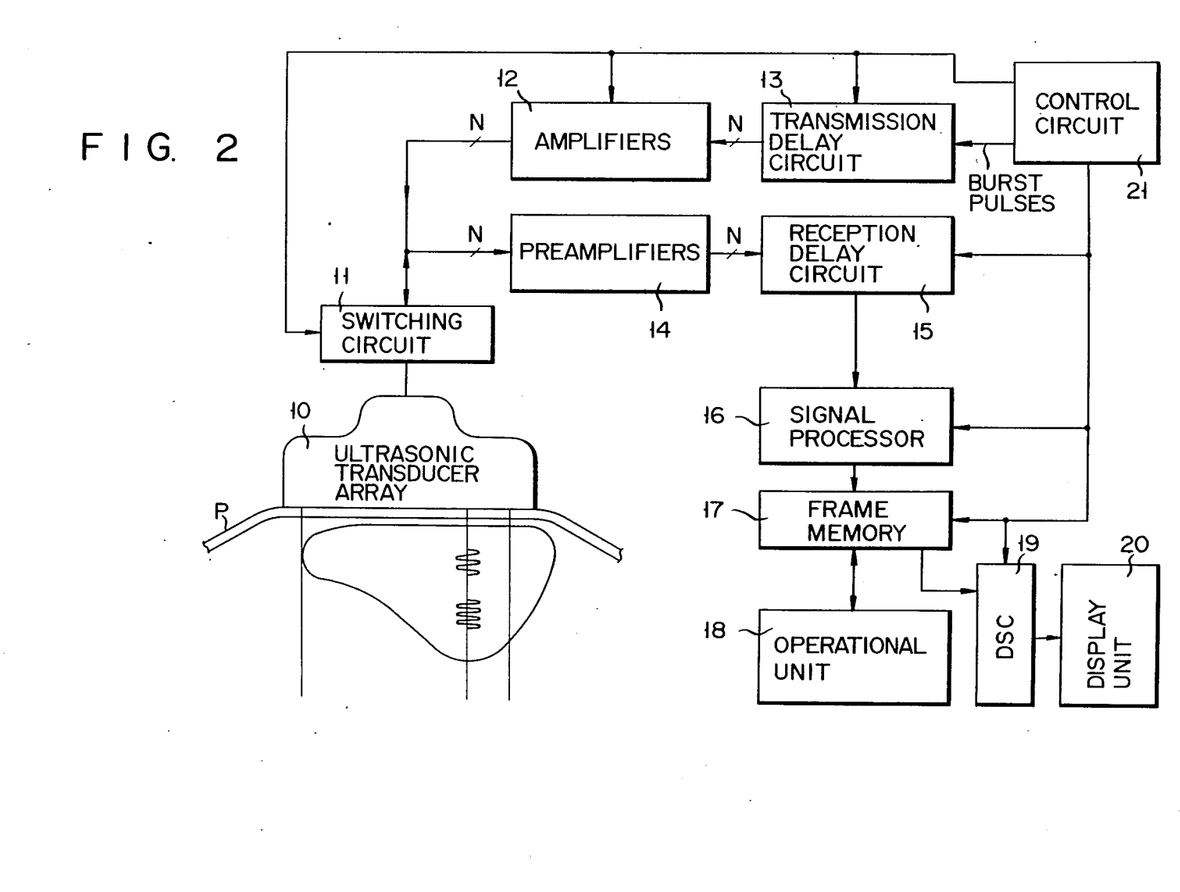
FIG. 2 is a block diagram of a control circuit of a diagnostic apparatus of the present invention.

Referring to FIG. 2, an ultrasonic diagnostic apparatus according to an embodiment of the present invention comprises an ultrasonic transducer array 10 for radiating an ultrasonic wave into an organ P and for receiving a reflected wave therefrom. The tranducer array is preferably of a wide-band linear array type which has a double acoustic matching layer. For example, the transducer array 10 is designed to have an effective sensitivity in a frequency range of 1.5 MHz to 4 MHz. The ultrasonic diagnostic apparatus of the present invention has substantially the same arrangement as a prior art ultrasonic diagnostic apparatus for displaying an ultrasonic tomographic image of an object to be examined.

A switching circuit 11 has N xm (m=an integer>0) switching elements and N sets (channels) of switching elements are successively enabled in response to a control circuit 21. Transducer elements of the array 10 are divided into N channels, and N-channel transducer elements receive, from amplifiers 12 through switching circuit 11, N burst-pulse trains appropriately delayed to focus ultrasonic waves. The transducer elements of each channel are driven at substantially the same time.

The burst-pulse trains are generated by control circuit 21, and are applied to a transmission delay circuit 13, which produces N appropriately delayed pulses to drive transducer array 10. The drive pulse trains are amplified by amplifiers 12 to an amplitude enough to drive transducer array 10. In this embodiment, each of burst pulse trains includes burst pulses of frequencies of 3.5 MHz (ω1) and 2 MHz (ω2) with a time interval τ therebetween.

The ultrasonic diagnostic apparatus of the present invention can be used for displayiing an ordinary ultrasonic tomographic image (B-mode image) based upon the intensity of the reflected signal in addition to for displaying a tomographic image in accordance with the non-linear parameter. In order to display the ordinary ultrasonic tomographic image, the control circuit 21 need only generate a burst pulse with a single frequency.

An ultrasonic wave emitted from transducer array 10 is reflected inside the organ, and the reflected wave is received by transducer array 10. N-channel reception signals received by array 10 is supplied to preamplifiers 14 through switching circuit 11. The N-channel output signals of preamplifiers 14 are applied to a reception delay circuit 15 responsive to control circuit 19. Circuit 15 performs a reception focus processing for the reception signals. Move specifically, circuit 15 appropriately delays the reception signals so that they are in phase and adds the in-phase signals together. Note that the number of reception channels need not always coincide with that of transmission channels.

An output signal of circuit 15 is applied to a signal processor 16. Processor 16 is responsive to control circuit 15 to perform signal processings such as amplitude demodulation and A/D conversion of the reception signals, and STC (sensitivity timing control) in the case of B-mode image display.

Figure 6:
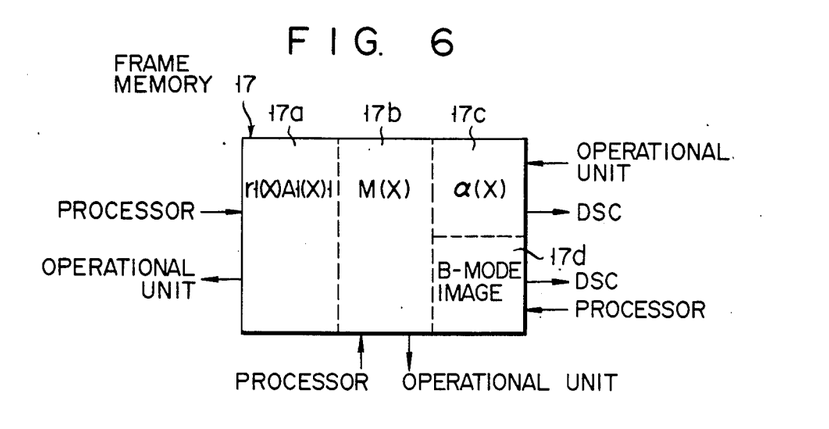
FIG. 6 is a view for explaining storage regions of a frame memory shown in FIG. 3.

Output signals of processor 16 are applied to a frame memory 17 and stored therein. Memory 17 has a plurality of divided storage regions 17a, 17b, 17c and 17d, as shown in FIG. 6, for storing different information. For example, region 17a is adapted for storing information on the intensity r(x)A1(x) of the reflected wave as a function of time from the generation timing of the ω1 ultrasonic wave. Region 17b is adapted to store information on the intensity M(x) of the differential reflected wave as a function of time from the generation timing of the ω1 ultrasonic wave. Region 17c is adapted to store data associated with the non-linear parameters α(x). Region 17d is adapted to store B-mode image information from processor 16. The storage regions for storing information on the non-linear parameter and the B-mode image are coupled to a digital scan converter (DSC) 19, to be displayed by a display unit 20.

An operational unit 18 conducts a required operation upon reception of data from memory 17 when the non-linear parameter is displayed, and supplies the operation result to memory 17.

Figure 3:
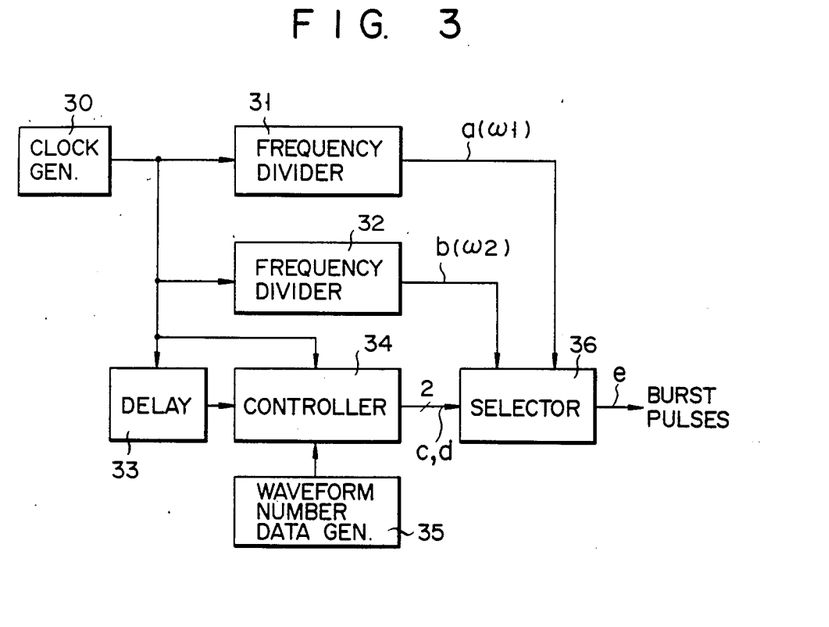
FIG. 3 shows an arrangement for generating burst pulses included in the control circuit shown in FIG. 2.
Figure 4A:
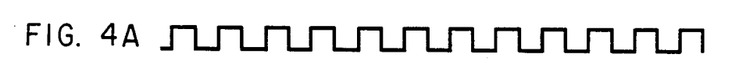
FIGS. 4A, 4B, 4C, 4D and 4F are a timing chart for explaining the operation of the arrangement shown in FIG. 3.
Figure 4B:
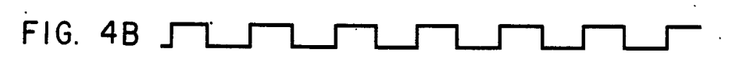
Figure 4C:
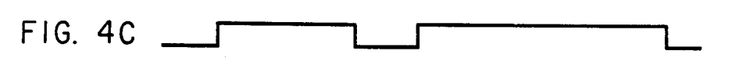
Figure 4D:
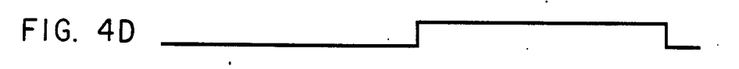
Figure 4E:
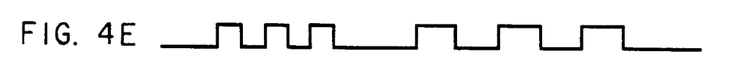

An arrangement which is part of control circuit 21, for generating the burst pulses will be described with reference to FIGS. 3 and 4. A clock generator 30 is provided for generating clock pulses if, for example, 14 MHz. The clock pulses are frequency-divided by a divide-by-4 divider 31 and a divide-by-7 divider 32, thereby forming pulse outputs a and b at 3.5 MHz (ω1) and 2 MHz (ω2), as shown in FIGS. 4(A) and 4(B). The output of generator 30 is coupled to a delay circuit 33 and a controller 34. The output of delay circuit 33 is coupled to controller 34. A wave-number data generator 35 generates data for determining the number of pulses included in burst pulses (3 in this embodiment) and the delay time between the $\omega 1$ burst pulses and the $\omega 2$ burst pulses. Output data of generator 35 is coupled to controller 34. Controller 34 supplies 2-bit selection signals c and d to a selector 36 in response to generator 30, circuit 33 and generator 35. Selector 36 selects one of the output pulses a and b from dividers 31 and 32 in accordance with the output signals of controller 34. Burst pulse trains having the burst waves of $\omega 1$ and $\omega 2$ are extracted from selector 36, as shown in FIG. 4(E).

Controller 34 produces the selection signals c and d so that selector 36 sequentially selects the pulses a ($\omega 1$) and b ($\omega 2$). When the selection signal c shown in FIG. 4(C) is 1 and the selection signal d shown in FIG. 4(D) is 0, selector 36 selects the pulses of $\omega 1$ from divider 31, and when c=1 and d=1, selects the pulses of $\omega 2$ from divider 32. Controller 34 first produces the selection signal c keeping level 1 during an interval corresponding to three periods of clock pulses a, as shown in FIG. 4(C). As a result, the burst wave including three pulses of the frequency $\omega 1$ can be obtained from selector 36, as shown in FIG. 4(E). Controller 34 sets the selection signals c and d at level 1 after a delay of three periods of the pulses a from the first rising edge of the selection signal c in response to delay circuit 33. The 1-level period of the selection signals c and d lasts for three periods of the pulses b. As a result, the burst wave including three pulses b of frequency $\omega 2$ is derived from selector 36 after a delay of $\tau$ from the $\omega 1$ burst wave. A burst pulse train e having the burst waves of $\omega 1$ and $\omega 2$ is supplied to transmission delay circuit 13.

Figure 5:
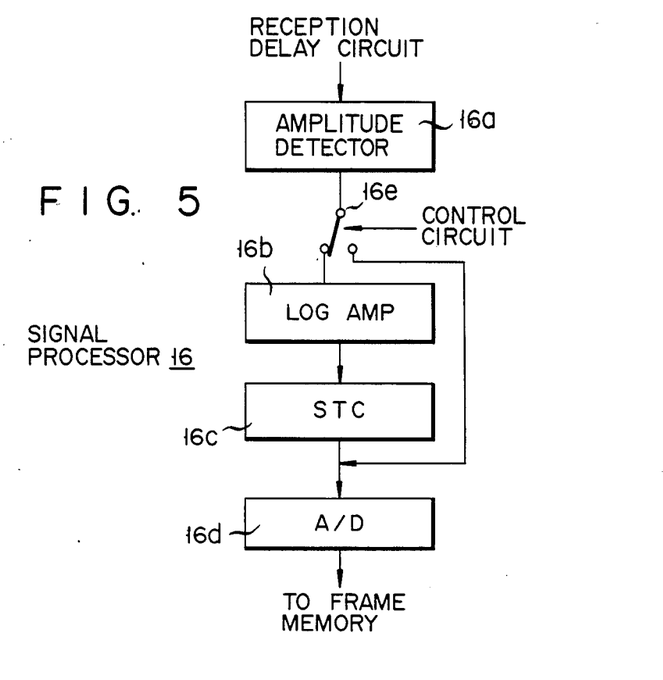
FIG. 5 is a schematic diagram of a signal processor of FIG. 2.

FIG. 5 shows an arrangement of signal processor 16. An output signal of reception delay circuit 15 is supplied to an amplitude detector 16a to recover amplitude information therefrom. The output of detector 16a is selectively coupled to a logarithmic amplifier 16b or an A/D converter 16d by a switch 16e responsive to control circuit 21. In the case of the B-mode image display, the output of detector 16a is coupled to amplifier 16b, and then coupled to A/D converter 16d through an STC circuit 16c. As is well known, amplifier 16b and STC circuit 16c perform exponential functional gain compensation for the B-mode image reproduction. The digitized B-mode image data is stored in region 17d of frame memory 17. In the case of the non-linear parameter display, the output of detector 16a is coupled to A/D converter 16d. In this case, the intensity data $r1(x)A1(x)$ of the reflected wave of $f1$ and the intensity data $M(x)$ of the differential reflected wave are obtained from A/D converter 16d, and these data are written into regions 17a and 17b of memory 17 under the control of control circuit 21.

Figures 7, 8:
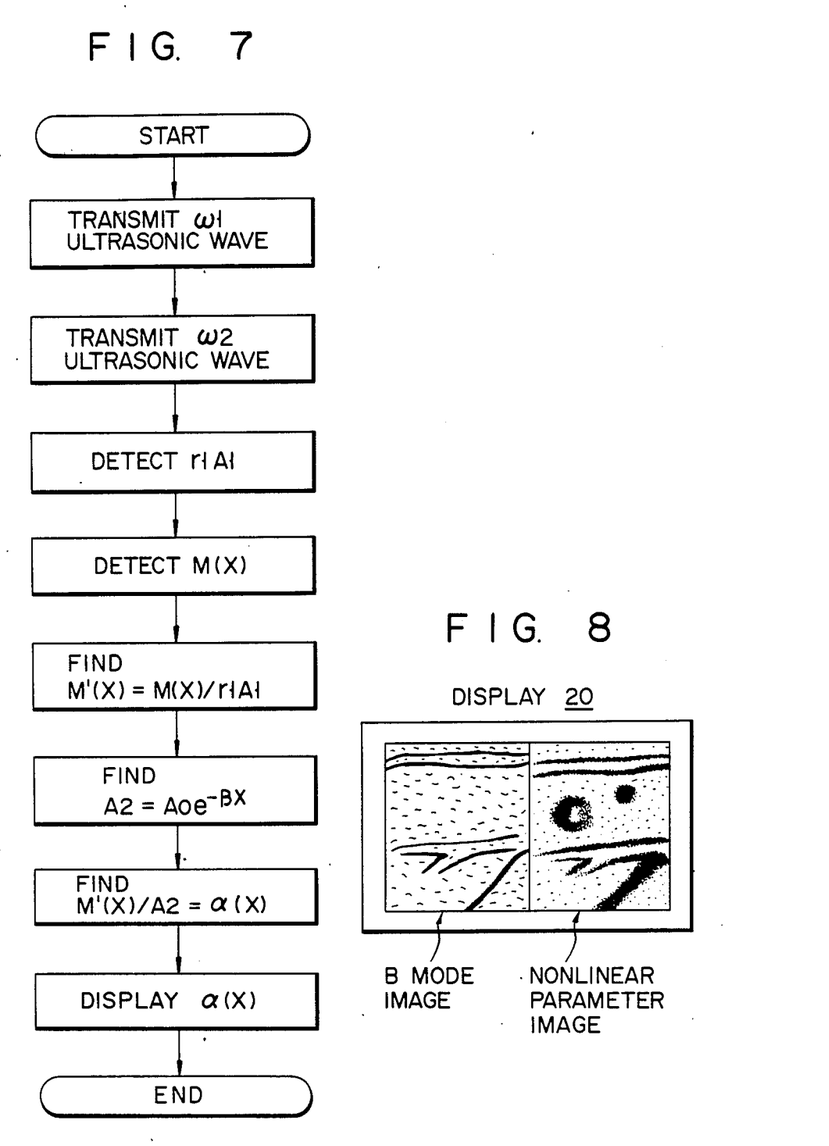
FIG. 7 is a flow chart for calculating non-linear parameters of an organ according to the present invention.
FIG. 8 is an illustration showing an example of a display screen of a display unit.

The operation of the apparatus shown in FIG. 2 will be described with reference to a flow chart shown in FIG. 7. In particular, non-linear parameter display will be described in detail.

Transmission delay circuit 13 operates in response to control circuit 21, to apply N transmission delay control signals to amplifiers 12. Amplifiers 12 amplify the N-channel burst pulse trains having burst waves of frequencies $\omega 1$ and $\omega 2$ shown in FIG. 4(E) to a desired level, and supply them to transducer 10 through switching circuit 11. As a result, the ultrasonic burst waves of $\omega 1$ and $\omega 2$ are radiated to an organ for each channel at a time interval $\tau$, thereby scanning the organ.

As a result, the reflected signals of $\omega 1$ and $\omega 2$ and the differential reflected signal of ($\omega 1 - \omega 2$) generated due to the non-linear effect in the organ are received by transducer 10. Each channel reception signal received by transducer 10 is supplied to preamplifiers 14, reception delay circuit 15, and signal processor 16. The data $r1(x)A1(x)$ representing the intensity of the ultrasonic reflected wave of $\omega 1$ is detected through amplitude detector 16a and A/D converter 16d of processor 16, and is stored in region 17a of frame memory 17 as a function of time. In the storage regions of memory 17, a direction of width (lateral direction) thereof corresponds to the direction of width of ultrasonic transducer 10, and the vertical direction corresponds to the depth of organ, or time from an instant of generation of ultrasonic wave.

The same processing as described above is carried out for the differential reflected wave ($\omega 1 - \omega 2$). Thus, the intensity $M(x)$ of the differential reflected wave is detected and stored in region 17b of memory 17 as a function of time.

Operational unit 18 reads out the data $r1(x)A1(x)$ and $M(x)$ of memory 17, and calculates $M'(x) = M(x)/r1(x)A1(x)$. Furthermore, operational unit 18 performs the exponential function gain compensation $A2 = A0 e^{-\beta x}$ for the ultrasonic wave of $\omega 2$ using an initial value $A0$ which may be an arbitrary value. Typically, $\beta$ is substantially equal to 0.5 dB/cm·MHz. It is preferred that $\beta$ can be variably set with this value at center. The reason for using an arbitrary value as the initial value is that the non-linear parameters need not be obtained as absolute values and relative values over an inspection area of an organ suffice for inspection. Operational unit 18 further calculates $M'(x)/A2$ using the operation results of $M'(x)$ and $A2$. As is apparent from the above description on the principle, $M'(x)/A2$ represents a non-linear parameter $\alpha(x)$ of the organ. The non-linear parameter data is transferred to region 17c of memory 17, and is displayed in display unit 20 through DSC 19.

The B-mode image display will be described. In this case, the burst pulses at a single frequency of $\omega 1$ or $\omega 2$ need only be generated. When the reflected wave of the ultrasonic wave of the single frequency is received, processor 16 performs signal processing such as amplitude detection, exponential gain compensation and A/D conversion, and the resultant B-mode image data is stored in region 17d of frame memory 17. The B-mode image data is displayed in display unit 20 trough DSC 19.

The non-linear parameter display of the organ according to the present invention can be achieved by slightly modifying a conventional apparatus for displaying a B-mode image. B-mode image detection and non-linear parameter detection can be selectively conducted. In this case, the B-mode image and the non-linear parameter image can be displayed on different regions of a screen of a display unit at the same time, as shown in FIG. 8, or a desired one of these images can be selectively displayed on the screen. Even if a diseased portion is unclear in the B-mode image, there will occur a large difference in non-linear parameter at this portion. The non-linear parameter image can reveal this portion more clearly as shown in FIG. 8.

What is claimed is:

1. A method of displaying a tomographic image indicating a non-linear parameter of an object, comprising the steps of:

sequentially directing two ultrasonic burst waves of different frequencies $\omega 1$ and $\omega 2$ into the object, the two ultrasonic bursts being separated by a predetermined time interval so that echoes of the ultrasonic burst wave of frequency $\omega 1$ reflected from the object are mixed within the object with the ultrasonic burst wave of frequency $\omega 2$ reflected from the object;

detecting echoes of the reflected waves from the object having the frequency $\omega 1$;

detecting echoes of the reflected waves from the object having a frequency $(\omega 1 - \omega 2)$ created by the mixing of the two ultrasonic burst waves of the frequencies $\omega 1$ and $\omega 2$ and the reflection of those mixed waves from the object;

obtaining signals representative of the non-linear parameter of the object by comparing the echoes of the frequency $(\omega 1 - \omega 2)$ with the echoes of the frequency $\omega 1$; and displaying from the representative signals a tomographic image of the non-linear parameter of the object on a monitor.

2. A method of obtaining a non-linear parameter of an object, comprising the steps of:

sequentially directing two ultrasonic burst waves of different frequencies $\omega 1$ and $\omega 2$ into the object, the two ultrasonic bursts being separated by a predetermined time interval so that echoes of the ultrasonic burst wave of frequency $\omega 1$ reflected from the object are mixed within the object with the ultrasonic burst wave of frequency $\omega 2$ reflected from the object;

detecting echoes of the reflected waves from the object having the frequency $\omega 1$;

detecting echoes of the reflected waves from the object having a frequency $(\omega 1 - \omega 2)$ created by the mixing of the two ultrasonic burst waves of the frequencies $\omega 1$ and $\omega 2$ and the reflection of those mixed waves from the object; and obtaining signals representative of the non-linear parameter of the object by comparing the echoes of the frequency $(\omega 1 - \omega 2)$ with the echoes of the frequency $\omega 1$.

3. An apparatus for obtaining a non-linear parameter of an object comprising:

ultrasonic transducer means for directing ultrasonic waves into an object and receiving echoes reflected from the object;

scanning means coupled with said transducer means for activating said transducer means to sequentially send two ultrasonic burst waves of respective first and second frequencies into the object, the two ultrasonic bursts being separated by a predetermined time interval so that echoes of the first ultrasonic burst wave of the first frequency reflected from the object are mixed within the object with the second ultrasonic burst wave of the second frequency reflected from the object;

means coupled with said transducer means for activating said transducer means to detect echoes of the reflected waves from the object having the first frequency as a function of time;

means coupled with said transducer means for activating said transducer means to detect echoes of the reflected waves from the object having the differential frequency between the first and second frequency created by the mixing of the two ultrasonic burst and the reflection of those mixed waves from the object;

storing means coupled with said transducer means for storing the echos of the first frequency and the echoes of the differential frequency; and calculating means coupled with said storing means for obtaining the non-linear parameter of the object by comparing the stored echoes of the differential frequency with the stored echoes of the first frequency.

4. An apparatus according to claim 3, wherein said storing means stores said echoes of the differential frequency as a function of time.

5. A method of displaying a tomographic image indicating a non-linear parameter of an object, comprising the steps of:

sequentially radiating two ultrasonic burst waves of frequencies $\omega 1$ and $\omega 2$ into the organ, the two burst waves being separated by a predetermined time interval so that the echoes of the ultrasonic burst wave of frequency $\omega 1$ reflected from the object are mixed within the object with the ultrasonic burst wave of frequency $\omega 2$ reflected from the object;

detecting an intensity of a reflected wave of the frequency $\omega 1$ reflected from within the object as a function of time from an instant of generation of the ultrasonic burst wave of the frequency $\omega 1$;

detecting an intensity of a reflected wave of a frequency $(\omega 1 - \omega 2)$ equal to a difference between the frequencies $\omega 1$ and $\omega 2$, by mixing the wave of the frequency $\omega 2$ with the wave of the frequency $\omega 1$ as a function of time from an instant of generation of the ultrasonic burst wave of $\omega 1$, the intensity of the reflected wave of the frequency $(\omega 1 - \omega 2)$ being dependent upon the non-linear parameter in the object;

obtaining a value representative of the non-linear parameter of the object based upon the detected intensities of the reflected waves of the frequencies $\omega 1$ and $(\omega 1 - \omega 2)$; and displaying from the value representative of the non-linear parameter a tomographic image of the non-linear parameter of organ.

6. A method according to claim 5 including the step of storing data on the intensities of the reflected waves of the frequencies $\omega 1$ and $(\omega 1 - \omega 2)$ in a memory as a function of time.

7. An ultrasonic diagnosing apparatus for displaying the non-linear parameter of an object comprising:

ultrasonic transducer means for directing ultrasonic burst waves into an object and receiving echoes reflected from the object;

scanning means coupled with said transducer means for activating said transducer means to sequentially send two burst waves of different frequencies $\omega 1$ and $\omega 2$, the two burst waves being separated by a predetermined time interval so that the echoes of the ultrasonic burst of frequency $\omega 1$ reflected from the object are mixed within the object with the ultrasonic burst wave of frequency $\omega 2$ reflected from the object;

means coupled with said transducer means for activating said transducer means to detect both the reflected burst waves having the frequency $\omega 1$ reflected from the object and the reflected burst waves having the differential frequency ($\omega 1 - \omega 2$) reflected from the object;

means coupled with said transducer means for detecting and storing, as a function of time, an intensity of the reflected wave of the frequency $\omega 1$ from the object and an intensity of a differential reflected wave of a frequency ($\omega 1 - \omega 2$) from the object, the intensity of the differential reflected wave being dependent upon the non-linear parameter in the object;

operational means coupled to said detecting and storing means for calculating a non-linear parameter of the object in accordance with the intensities of the reflected wave of the frequency $\omega 1$ and the differential reflected wave signal of the frequency ($\omega 1 - \omega 2$); and display means coupled with said operational means for displaying an image representative of the non-linear parameter of the object.

8. An apparatus according to claim 7, wherein said detecting and storing means includes a frame memory.

9. An apparatus according to claim 8, wherein said frame memory has different storage regions for respectively storing the intensity of the reflected wave of the frequency $\omega 1$ and the intensity of the differential reflected wave of the frequency ($\omega 1 - \omega 2$) as a function of time.

10. An apparatus according to claim 7, wherein the non-linear parameter calculated by said operational means is stored in said detecting and storing means.

* * * * *